(12) United States Patent
Villalpando

(10) Patent No.: US 6,581,101 B2
(45) Date of Patent: Jun. 17, 2003

(54) APPARATUS FOR GENERATING AND TRANSFERRING MANAGED DEVICE DESCRIPTION FILE

(75) Inventor: Victor Villalpando, Laguna Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/777,660

(22) Filed: Feb. 7, 2001

(65) Prior Publication Data

US 2001/0004745 A1 Jun. 21, 2001

Related U.S. Application Data

(62) Division of application No. 08/497,111, filed on Jun. 30, 1995, now Pat. No. 6,219,718.

(51) Int. Cl.$^7$ ................................................ G06F 9/00
(52) U.S. Cl. ........................................ 709/230; 709/317
(58) Field of Search ................................ 709/310–320, 709/230–237

(56) References Cited

U.S. PATENT DOCUMENTS

| | | | |
|---|---|---|---|
| 5,278,978 A | 1/1994 | Demers et al. | 707/101 |
| 5,303,243 A | 4/1994 | Anezaki | 714/13 |
| 5,367,635 A | 11/1994 | Bauer et al. | 709/221 |
| 5,404,532 A | 4/1995 | Allen et al. | 713/200 |
| 5,452,433 A | 9/1995 | Nihart et al. | 709/223 |
| 5,491,796 A | 2/1996 | Wanderer et al. | 709/202 |
| 5,509,123 A | 4/1996 | Dobbins et al. | 709/243 |
| 5,522,042 A | 5/1996 | Fee et al. | 709/226 |
| 5,561,769 A | 10/1996 | Kumar et al. | 709/202 |
| 5,710,908 A | 1/1998 | Man | 709/230 |
| 5,951,649 A | 9/1999 | Dobbins et al. | 709/238 |

FOREIGN PATENT DOCUMENTS

EP    599706    1/1994    ............. G06F/9/46

OTHER PUBLICATIONS

B. Moore, et al., "CMIP/SNMP Integration Prototype", Proceedings Of The Network Operations And Management Symposium, vol. 1, Symp. No. 4, Feb. 14, 1994, pp. 257–267.

S. Mazumdar, et al., "Design Of Protocol Independent Management Agent To Support SNMP And CMIP Queries", Integrated Network Management, III, vol. c–12, Apr. 1993, pp. 377–388.

M. A. Miller, P.E., "Troubleshooting TCP/IP–Analyzing the Protocol of the Internet", M&T Books, 1992, pp. 368–371, 373–374, 376–378 and 388.

O. Newkerk, M. Nihart and S. K. Wong, "The Common Agent—A Multiprotocol Management Agent", IEEE, J. Selected Areas in Communications, Dec. 1993, pp. 1346–1352.

(List continued on next page.)

*Primary Examiner*—St. John Courtenay, III
(74) *Attorney, Agent, or Firm*—Fitzpatrick, Cella, Harper & Scinto

(57) ABSTRACT

In a computer network, processing modules exchange data with a peripheral device using managers at the processing module having different management protocols and one or more different management protocol agents in a network interface at the managed device. Data descriptive of the characteristics of the managed device is generated in the network interface in response to a request from a processing module manager. The generated descriptive data is sent to the requesting manager by the agent having the same management protocol as the requesting manager and a managed device description file is formed from the generated descriptive data by the processing module manager to control the managed device.

32 Claims, 9 Drawing Sheets

OTHER PUBLICATIONS

S. Reasoner, "Management By Proxy Agent", Wescon Technical Papers, vol. 35, Nov. 1, 1991, pp. 190–195.

Sakuraba, et al., "Using a Networked Mach IPC Implemented in User–Space with X–Kernel", OSF Research Institute, Apr. 1994, pp. 1–13.

R. W. Stevens, Unix Network Programming, Prentice Hall, 1990, pp. 692–693.

M. Sylor and O. Tallman, "Applying Network Management Standards to System Management; The Case for the Common Agent", IEEE, Systems Management, 1993 International Workshop, pp. 110–117.

APPARATUS FOR GENERATING AND TRANSFERRING MANAGED DEVICE DESCRIPTION FILE

This application is a division of Application Ser. No. 08/497,111, filed Jun. 30, 1995 is now U.S. Pat. No. 6,219,718.

BACKGROUND OF THE INVENTION

1. Field of the Invention

The invention relates to networking processing modules and peripheral devices in a network connected computer system and more particularly to arrangements for providing information on the specifications of peripheral devices to processing modules using the peripheral devices in a network.

2. Description of the Related Art

In networked computer systems, processing modules and peripheral devices serving the processing modules are connected at different points of a network. The network couples the processing modules with other processing modules and the peripheral devices required to service the processing modules. Each processing module includes a manager that manages one or more peripheral devices servicing processing module applications by sending request messages to an agent at the managed device and receiving data returned from the managed device on status and attributes of the managed device. The messaging through the network may be performed using one of several available protocols. In exchanging data, the processing module application may use one of several different protocol models. If the OSI protocol model is employed, the CMIP management protocol is used for device management. Alternatively, the application may use the TCP/IP protocol model which includes the SNMP management protocol for device management.

U.S. Pat. No. 5,367,635 issued to Neal Bauer et al. on Nov. 22, 1994 discloses a computer network management system in which a user editable text file defining object identifications, object types and the path and name of associated executable software is generated and sent to a managed node. The user can then invoke user defined executable software by sending a network command and a user defined object identifier to the agent in a managed node. Data can then be sent between the user and the user defined executable software at the managed node. In order to manage a network peripheral device, however, the user processing module manager must store information on the characteristics of the device. The managed device characteristics information embedded in the processing module manager by the processing module supplier, however, may not correspond to the current characteristics of the managed device. As a result, the user executable software may not perform the desired functions in the managed device.

U.S. Pat. No. 5,404,532 issued to Wade C. Allen et al. on Apr. 4, 1994 discloses a networked computer system having communication between managers and agents in which an event forwarding discriminator in the agent program discriminates among events at the managed device to notify the manager only of significant events defined by the manager. The event forwarding discriminators are monitored so that if an event forwarding discriminator fails, the agent rebuilds or restores it with all its attributes and the manager is notified. The reconstruction of important portions of an agent, however, does not address the problem of providing a processing module manager with the characteristics of the agent of the managed device.

U.S. Pat. No. 5,278,978 issued to Richard A. Demers et al. on Jan. 11, 1994 discloses an arrangement for exchanging data between heterogeneous database systems by converting data in a receiving database system in which descriptive information exchanged between a sending database system and the receiving database system. In the event that the sending and receiving database systems are dissimilar, the data received in the format of the sending database system is converted to the format of the receiving database system. While the Demers et al. patent permits conversion of data between dissimilar machines, it does not relate to maintaining a managed device description file for the purpose of sending commands and controlling the device with respect to its status and attributes in a network.

Managed device characteristics are generally stored at the processing module manager in the form of a device description file specifying the characteristics of the managed peripheral device. The description file, generally denoted as an MIB (Management Information Base), for each management protocol is written in a different format. In the SNMP management protocol, the MIB of the manager uses a syntax ASN.1. The CMIP management protocol uses a GDMO having the ASN.1 syntax but having a different format than the ASN.1 syntax for SNMP. In the event that the processing module manager operates under a different management protocol than the managed device, access to the data on the characteristics of the managed device may not be properly parsed by the processing module manager so that generation of a managed device description file at the manager would not be possible.

A description file for a peripheral device is generally supplied with the processing module manager for the application and is of the type corresponding the management protocol of the manager. A peripheral device in the network system, however, may utilize another management protocol so that the description file at the manager is not appropriate for the peripheral device. As a result, request messages from the manager based on the format of the management protocol thereat cannot be parsed by the agent in the managed peripheral device. Further, changes in the peripheral device may not be reflected in the description file supplied to the processing module manager from an outside source and a new peripheral device may be added for which there is no description file in the processing module manager.

If the management protocol of the processing module manager is different than the management protocol of a peripheral device managed by the processing module, data packets between the processing module manager and the agent of the managed device may not be sent with compatible management protocols and the description file at the processing module manager may not be in the required syntax. As a result, it is a problem in networked computer systems that description files of managed devices residing in processing module managers may not be useful in making queries on the status and the attributes of the managed device. Neither of the aforementioned patents address the problem of exchanging management data between processing module managers and managed device agents in a networked computer system having various management protocols.

SUMMARY OF THE INVENTION

The invention is directed to a networked computer system in which processing modules and peripheral devices serving the processing modules are coupled via a network. Each processing module has a manager operating under a predetermined management protocol that manages the serving peripheral devices. One or more of the peripheral devices has at least one agent for exchanging management information with the processing module managers over the network. A generating unit coupled to the at least one agent at the managed peripheral device generates data for determining a description file of the managed peripheral device in a format corresponding to the management protocol of the processing module manager using the peripheral device. The description file generated data is sent to the agent of the managed peripheral device. The agent receives the description file generated information and sends it to the processing module manager using the management protocol of the processing module manager.

In one embodiment of the invention, a network expansion board couples the managed peripheral device to the processing module manager through the network. An agent in the network expansion board that has the same management protocol as a manager requesting description file data receives the request and sends a command signal to a management information base (MIB) generator in the network expansion board. In response to the command signal from the agent, the MIB generator returns attribute and attribute value signals to the agent and the agent forms and sends one or more response messages to the manager through the network. At the processing module, the manager generates a description file which it then employs to exchange information with and to control the peripheral device.

In another embodiment of the invention, the network expansion board includes plural agents, each with a different management protocol. The agent having the same management protocol as the requesting manager receives the request and sends a command signal to the MIB generator. In response, the MIB generator generates and returns the description file signals of the peripheral device to the agent. The agent then forms data messages from the description file signals to the requesting processing module manager and sends the data messages to the requesting manager using the same management protocol as the requesting manager.

In yet another embodiment of the invention, the agent having the same management protocol as that of the requesting manager receives the request and generates command signals which address the peripheral device attributes and attribute values stored in the MIB generator. The description file data is retrieved from the MIB generator by the agent which forms data messages corresponding thereto. The agent then sends the description file data messages to the requesting manager through the network. Upon receiving the description file data, the requesting manager generates and stores a description file for use in exchanging information with and managing the peripheral device.

A more complete understanding of the invention is described with reference to the following detailed description of the preferred embodiment thereof in connection with the attached drawings.

DETAILED DESCRIPTION OF THE PREFERRED EMBODIMENT

Figure 1:
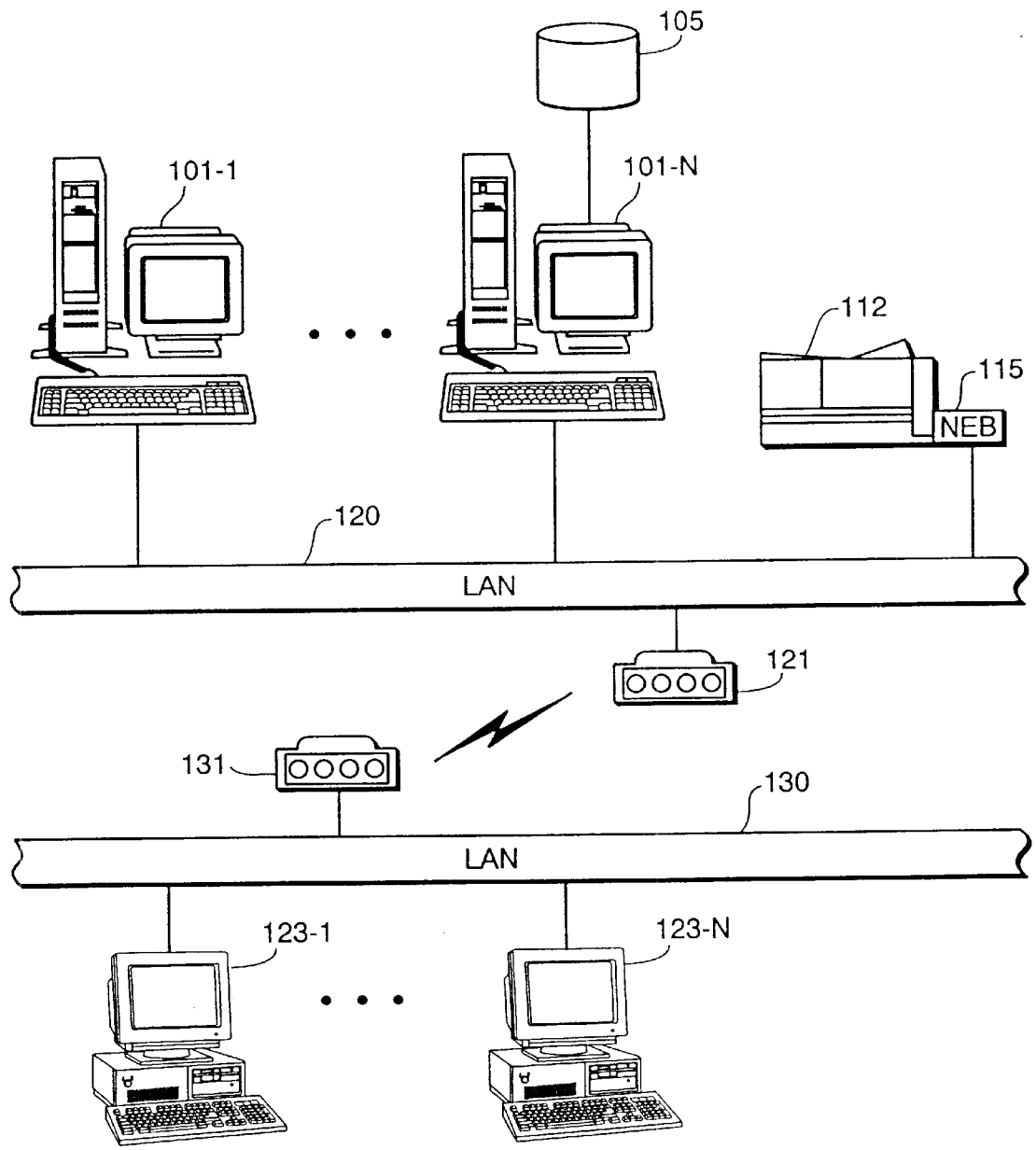
FIG. 1 depicts a computer network structure having an arrangement of processing modules and peripheral devices coupled to interconnected local area networks.

FIG. 1 shows a computer system in which plural processing modules and peripheral devices are coupled through interconnected local area networks (LAN). Referring to FIG. 1, there are shown LANs 120 and 130, work stations 101-1 through 101-N, terminals 123-1 through 123-N, a printer 112, a network expansion board 115 at the printer 112, a disk drive unit 105 and wireless coupling modules 121 and 131. Work stations 101-1 through 101-N are connected to the LAN 120 and terminals 123-1 through 123-N are connected to the LAN 130. The printer 112 is coupled to the LAN 120 through the network interface board 115 and the disk drive unit 105 is connected to the work station 101-N. The wireless coupling modules operate to interconnect the LANs 120 and 130.

As is well known in the art, the arrangement of FIG. 1 permits each processing module to utilize the resources of the other processing modules and peripheral devices connected to the network although the processing modules and the other network resource devices may be located in different offices, on different floors of the same building or in different buildings. For example, the terminal 123-1 can be coupled to the printer 112 and/or to the disk device connected to work station 101-N so that the special services provided by the printer 112 and the work station 101-N may be utilized by a user at terminal 123-1. Coupling of processing modules with other processing modules and peripheral devices is performed by exchanging data packets through the network using a standard protocol. The OSI and the TCP/IP protocol models in common use permit exchange of data among the different apparatus connected to the network.

Figure 2:
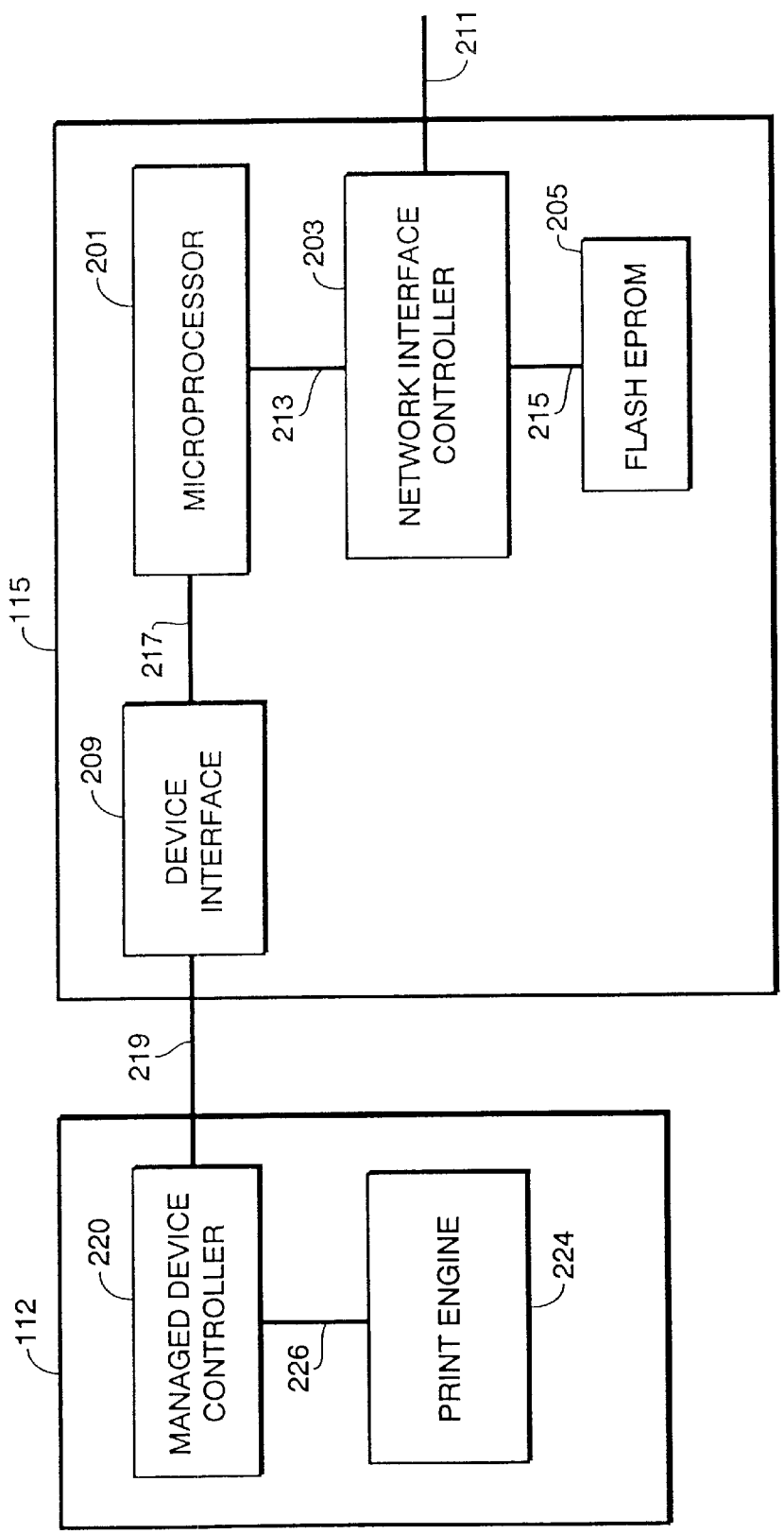
FIG. 2 is a general block diagram of a network interface board connected between a local area network and a network printer.

FIG. 2 is a general block diagram of the network expansion board (NEB) 115 connected between the LAN 120 and the printer 112. The NEB 115 provides hardware, software and firmware that permits a network peripheral, such as a printer, to be an intelligent, interactive network member that receives and processes data from the network, and also transmits to the network significant amounts of data about the peripheral such as detailed status information and operational parameters. The NEB 115 may also be used to connect other peripheral devices such as facsimile devices, copiers, image processors or peripheral devices in which facsimile, copying and image processing are combined into one unit to the network.

Referring to FIG. 2, the NEB 115 includes a microprocessor 201, a network interface controller 203, a flash or electrically programmable memory 205 used to control the microprocessor 201 through the network interface controller 203 and a managed device interface 209. The microprocessor 201 may preferably be an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. The printer 112 includes a device controller 220 and a print engine 224. The network interface controller 203 is coupled to the LAN 120 through a cable 211, to microprocessor 201 through a line 213 and to the flash memory 205 through a line 215. The managed device interface 209 is coupled to the microprocessor 201 through a line 217 and is coupled to the device controller 220 through a line 219.

In the printer 112, the device controller 220 is coupled to the print engine 224 via a line 226. The managed device interface 209 allows extensive printer status and control information to be exported to NEB 115 and thence to an external network node so as to allow programming of many useful support functions. In the NEB 115, blocks of print image data and control information are assembled by the microprocessor 201, are written into a shared memory in the managed device interface 209, and are then read by printer controller 220. Likewise, printer status information is transferred from printer controller 220 to the shared memory of the managed device interface 209, from which it is read by the microprocessor 201.

In operation, the network interface controller 203 receives data and control information from a processing module (e.g. 101-1) which it may serve via the LAN 120 and the line 211 and sends status information on the printer 112 to the processing module using the printer through the LAN 120. The managed device interface 209 transfers print data and control information data received from the microprocessor 201 to the device controller 220 of the printer 112 and transfers status signals from the device controller 220 to the microprocessor 201. The status signals may include information on transient state; on-line, printing; off-line, not printing; engine test detected; maintenance program running; in sleep mode; paper out; printer open; paper jam; no EP cartridge; toner low; U-L feed; load paper; feed paper; CaPSL operator call; upper feeder reject; middle feeder reject; lower feeder reject; set upper; set middle; paper drain; tray full; page full; 22 LINE ERROR; 40 LINE ERROR; download memory full; working memory full; deadlock memory full; job reject; print check; font full; engine warming up; external operator call; front card removal; NVRAM full; hard disk full; memory full; low resolution, can't switch to low; hard disk crash; "please power off"; full paint reject; scale error; duplex reject; expansion I/O error; tray trouble; resident ROM: bad format; not supported option; no option font; unavoidable memory full; service call is active; starting state; going off-line; going on-line; off-line, not printing, in a menu; transient, menu finished, return to OFFLINE; panel reset requested; SWOFF detected (power down request); reboot system; panel form feed requested; panel form feed cancelled; external program test print; test print cancelled; maintenance program done.

The managed device interface 209 includes a shared buffer memory to store data being transferred and a control logic unit that directs the flow of information between the microprocessor 201 and the device controller 220 or other arrangements well known in the art. The arrangement of the network interface controller 203, the microprocessor 201 and the controlled device interface 209 provides bidirectional information exchange between the printer 112 and the processing module using the printer. Examples of bidirectional network interfaces are described in U.S. Pat. No. 5,323,393, which describes a network device having a bi-directional SCSI interface and U.S. patent application Ser. No. 08/336,062, entitled "Network Protocol Sensor", which describes a network device having a bidirectional shared memory interface.

Figure 3:
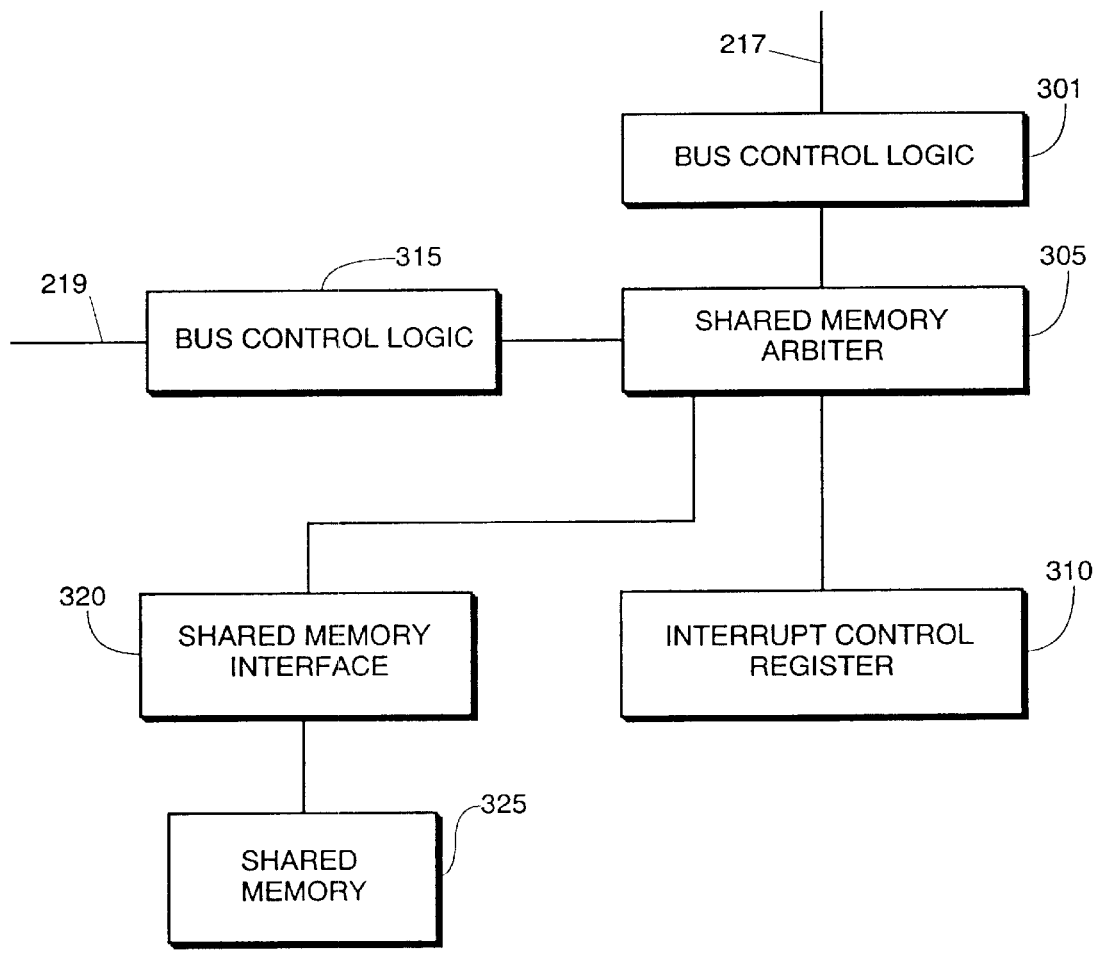
FIG. 3 is a more detailed block diagram of the managed device interface of FIG. 2.

FIG. 3 is a more detailed block diagram of the controlled device interface 209. The controlled device interface 209 includes a shared memory 325, a shared memory interface 320, a shared memory arbiter 305, an interrupt control register 310 and bus control logic units 301 and 315. Referring to FIG. 3, the bus control logic 301 communicates with the microprocessor 201 through the line 217 and the managed device controller 220 communicates with bus control logic 315 through the line 219. Shared memory accesses from the bus of the managed device controller 220 and the bus of the microprocessor 201 are routed to the shared memory arbiter 305 which determines the priority of the buses and permits the bus having priority to access the shared memory 325. The interrupt control register 310 also accessed through the shared memory arbiter 305 allows interruption of one of the microprocessor 201 and the managed device controller 220 by the other.

In operation, the controlled device interface 209 interleaves concurrent accesses of the microprocessor 201 and the controller 220 by allowing access to the shared memory 325 on a first-come, first-serve basis. The lower priority unit of the microprocessor 201 and the controller 220 is presented with a wait state while the higher priority unit has access to the shared memory 325. In the event of simultaneous access requests, the microprocessor 201 is given priority. A large portion of the shared memory 325 has a ring buffer structure into which the microprocessor 201 writes print data and from which the printer controller 220 reads the print data. As the writing and reading of data blocks proceeds, the microprocessor 201 and the controller 220 update their respective "put" and "get" pointers to indicate the next location that should be accessed. By comparing the "put" and "get" pointer, the writing unit of microprocessor 201 and controller 220 can then determine the availability of memory space and the reading unit can determine whether there is data to be read. Contention for the shared memory 325 is reduced by allowing the printer controller 220 sole access to the shared memory 325 until its reading catches up with the writing of the microprocessor 201.

As is well known, the operations of a peripheral device such as printer 112 in servicing processing modules such as work stations 101-1 and 101-N through the LAN 120 are managed from the processing modules. In running an application, a manager in the processing module exchanges messages in the form of packet data units with an agent residing in the flash memory 205 of the NEB to manage the operations of the printer 112 in the application. The packet data units (PDU) sent by the processing module manager employ a predefined management protocol in sending PDUs to the agents residing in the NEB 115 and in receiving PDUs from the NEB 115.

Figure 4:
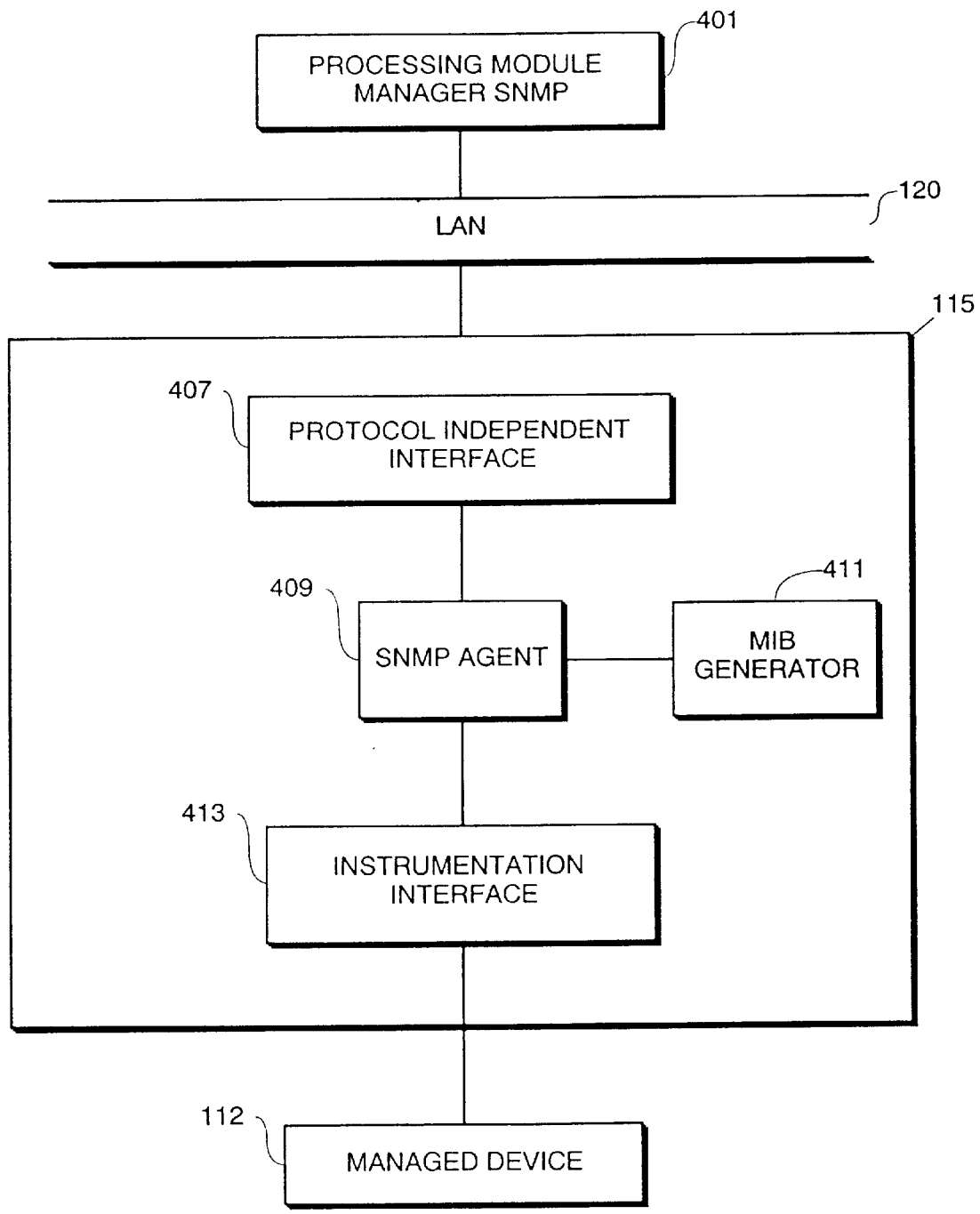
FIG. 4 is a diagram illustrating the arrangement of an agent between instrumentation and network interfaces in the network interface board of FIG. 2 according to a first embodiment of the invention.
Figure 5:
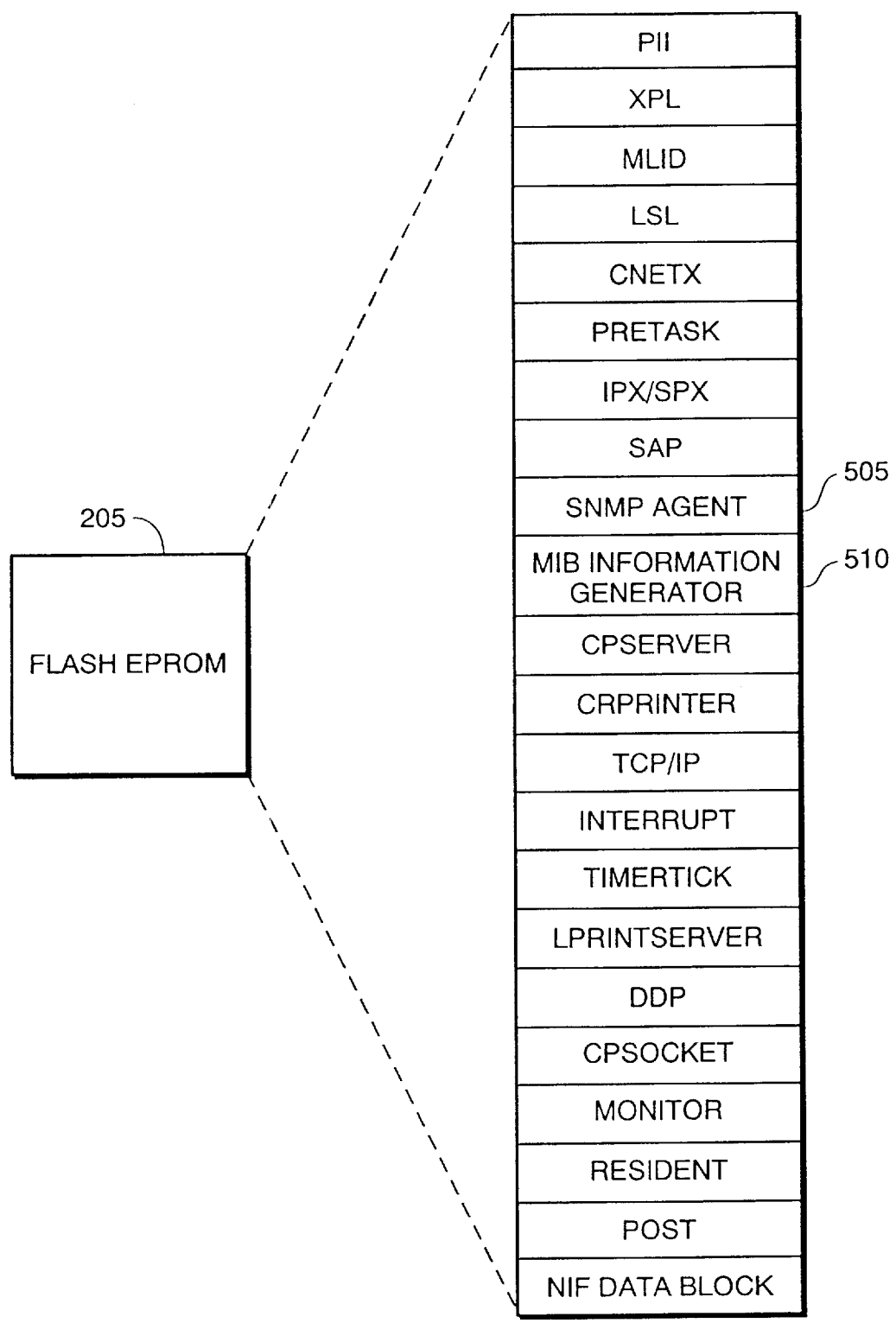
FIG. 5 shows an arrangement of the agent and a management information base software module in the control memory of the network interface board of FIG. 2 according to the first embodiment.

FIG. 4 illustrates diagrammatically the arrangement of an agent between instrumentation and network interfaces in the network interface board of FIG. 2 according to the first embodiment of the invention. In FIG. 4, there are shown an SNMP processing module manager 401, the LAN 120, a protocol interface 407, an SNMP agent 409, a management information base (MIB) information generator 411, an instrumentation interface 413 and a managed device 112. The SNMP agent 409, the MIB information generator 411 and the instrumentation interface 413 are instruction code modules stored in the flash memory 205 of FIG. 2. FIG. 5 illustrates the placement of the SNMP agent module 505 and the MIB information generator module 510 in the flash memory 205. Also shown in FIG. 5 are the following instruction code modules, which are described in more detail in Ser. No. 08/495,172, "Adaptive Network Protocol Independent Interface" (attorney docket No. 36.P102): PII, XPL, MLID, LSL, CNETX, PRETASK, IPX/SPX, SAP, CP.SERVER, CRPRINTER, TCP/IP, INTERRUPT, TIMERTICK, LPRINTSERVER, DDP, CPSOCKET, MONITOR, RESIDENT, POST and NIF DATA BLOCK. The SNMP agent module 505, when activated, provides instruction codes that direct the operation of the microprocessor 201 to perform the SNMP agent functions and the MIB information generator module 510, when activated, controls the operation of the microprocessor 201 through its stored instruction codes.

The SNMP agent module may contain instruction codes which the microprocessor uses 201 to activate the MIB information module 510. When activated, the MIB information module 510 generates signals corresponding to a description of the peripheral device 112 from information stored in the memory 205. Alternatively, the stored information signals in the MIB information module are addressed by the agent which retrieves the values of the addressed signals.

In accordance with the invention, a processing module manager issues an MIB information request which is sent to the agent of the managed peripheral device having the same management protocol as that of the requesting manager. In response, the agent directs the MIB information generator to return the data on the characteristics of the managed device needed to construct an MIB file at the processing module manager, generates PDUs corresponding to the data returned by the MIB information generator and sends the PDUs to the processing module manager. Rather than relying on a management information base independently supplied with the processing module as in the prior art, the processing module manager in the present invention is provided with an up-to-date description file obtained from the agent of the managed device for use in querying the agent on its status and attributes.

Figure 6:
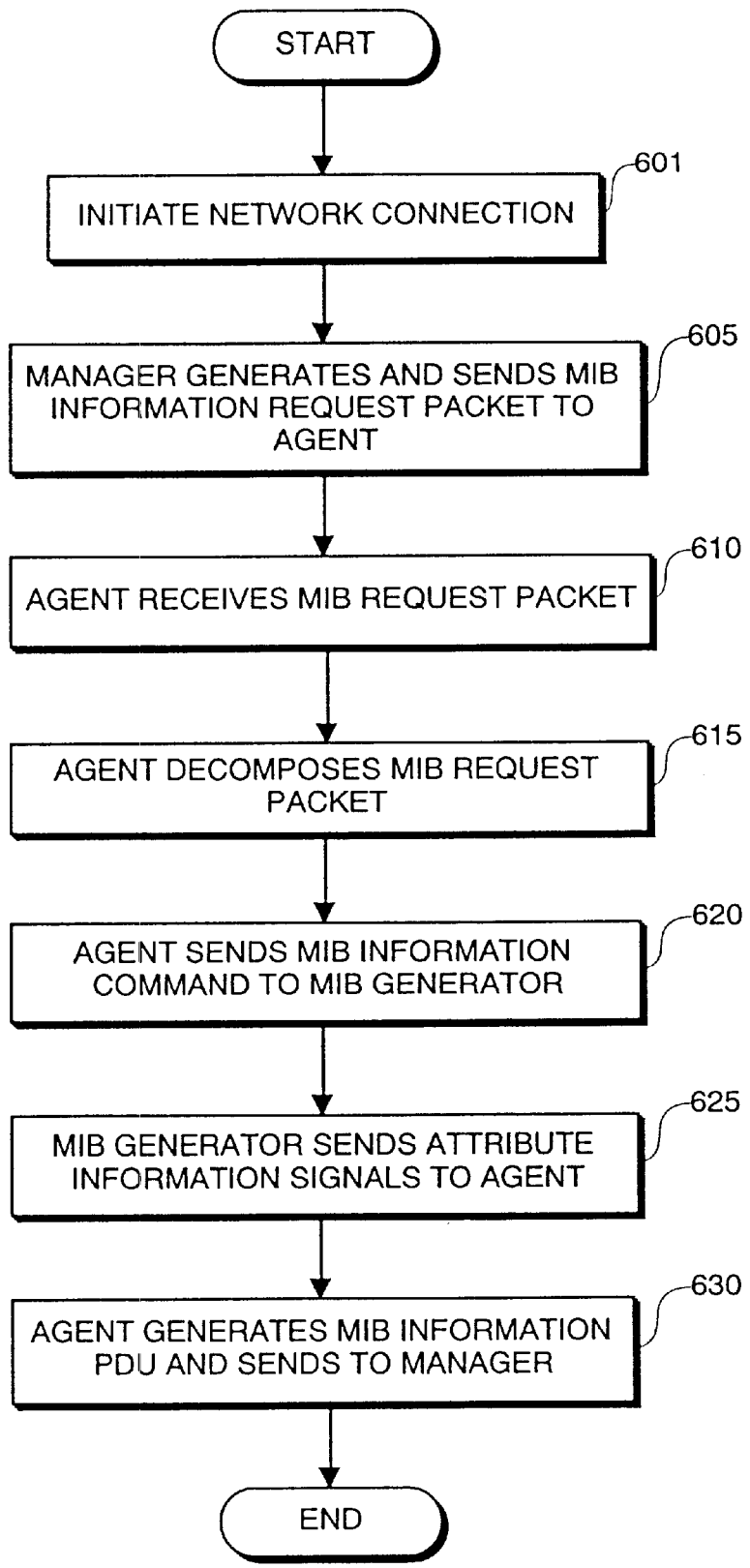
FIG. 6 is a flow chart illustrating the method of providing a processing module manager with data descriptive of the characteristics of a managed peripheral device according the first embodiment of the invention.

FIG. 6 is a flow chart that shows the operations of the microprocessor 201 of the NEB 115 which are determined by the instruction codes of the SNMP agent module 505 and the MIB information generator module 510. It is assumed for purposes of illustration that the networked coupled processing module manager 401 operates under the same management protocol as the agent 409. An arrangement with another management protocol may be used as long as the manager and the agent operate under the same management protocol. In step 601, a network connection with the managed device SNMP agent 409 is initiated by the SNMP manager 401. The manager 401 then generates an MIB information request packet and sends the packet to the agent 409 (step 605). When the agent 409 receives the MIB request packet (step 610), it decomposes the packet (step 615), generates an MIB information command signal and sends the MIB information command signal to the MIB generator (step 620). The MIB information generator 411 produces and returns the data needed to construct an MIB to the agent 409 (step 625) and the agent 409 generates the MIB information PDUs responsive to the returned data and sends the PDUs to the processing module manager 401.

In actual operation, the SNMP agent module 505 in the flash memory 205 is activated and the microprocessor 201 operates under control of the agent module 505 to perform the operations of steps 610, 615 and 620. The MIB information generator module 510 is then activated to control the microprocessor 201 to perform the operations of step 625 and the agent module 505 is reactivated after the data from the MIB information generator is made available to cause the microprocessor 201 to receive the data generated by the MIB information generator, to form the PDUs corresponding thereto and to send the PDUs to the processing module manager.

Figure 7:
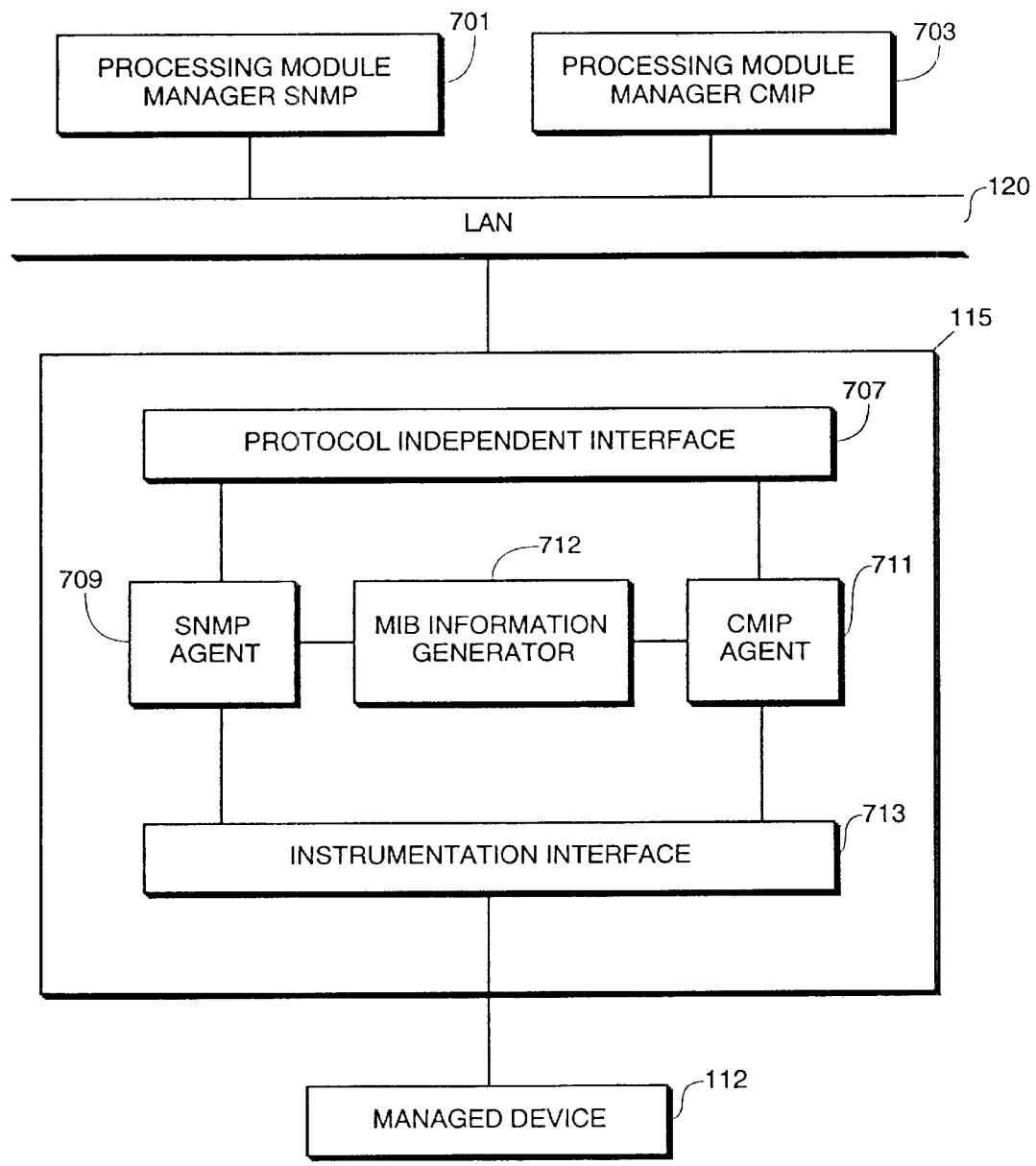
FIG. 7 is a diagram illustrating the arrangement of an agent between instrumentation and network interfaces in the network interface board of FIG. 2 according to a second embodiment of the invention.

FIG. 7 diagrammatically illustrates the operation of the NEB 115 according to a second embodiment of the invention. In this embodiment, there is an SNMP agent and a CMIP agent for the managed device so that an SNMP processing module manager and a CMIP processing module manager operating under different management protocols are each provided with MIB information to form an MIB description file according to its management protocol. In FIG. 7, there are shown an SNMP processing module manager 701, a CMIP processing module manager 703, a protocol interface 707, an SNMP agent 709, a CMIP agent 711, an MIB information generator 712, an instrumentation interface 713 and a managed device 112. The processing module managers 701 and 703 and the protocol interface 707 are coupled to the LAN 120. The SNMP agent 709 and the CMIP agent 711 are coupled between the protocol interface 707 and the instrumentation interface 713. The MIB information generator 712 is connected to both the SNMP agent 709 and the CMIP agent 711.

In accordance with the invention, plural agents each operating under a different management protocol are coupled to the processing module managers through the network. An MIB information request from a processing module manager is accepted by the agent operating under the same management protocol as the requesting manager and the data provided by the MIB information generator is formatted according to the management protocol of the requesting manager. The data is returned to the requesting manager which operates to form an MIB file at the processing module. In this way, a properly formatted up-to-date MIB file using the resident management protocol of the processing module manager is produced for use in querying the agent of the managed device with regard to status and attributes.

Figure 8:
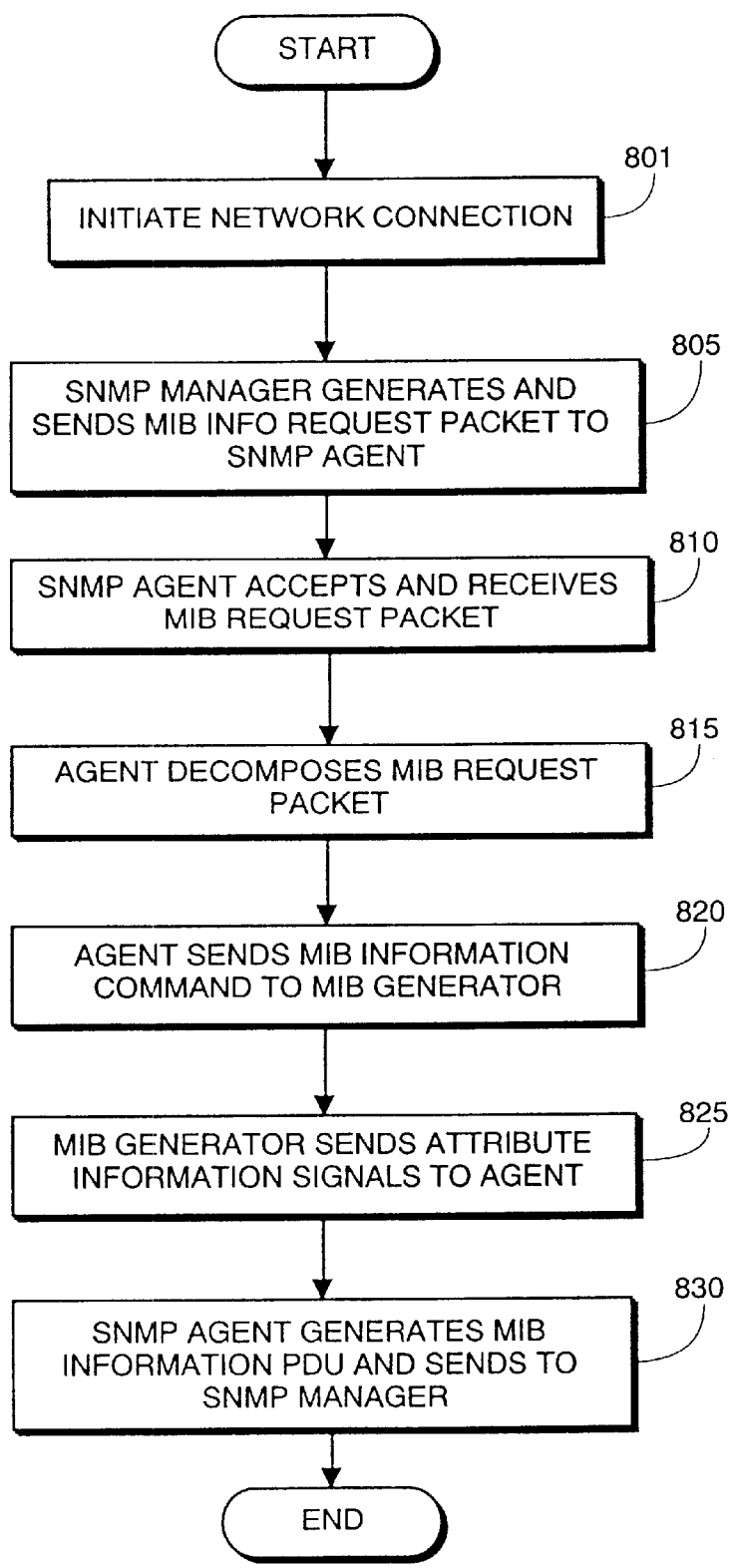
FIG. 8 is a flow chart illustrating the method of providing a processing module manager with data descriptive of the characteristics of a managed peripheral device according the second embodiment of the invention.

FIG. 8 is a flow chart that illustrates the operations of the NEB 115 according to the second embodiment of the invention. Referring to FIG. 8, a network connection is initiated by the requesting processing module manager (step 801). It is assumed for purposes of illustration that the SNMP manager 701 makes an MIB information request (step 805). In that case, the SNMP agent 709 accepts the request and receives the MIB information request. If the CMIP manager makes the request, it would be accepted by the CMIP agent 711. In response to the accepted MIB information request, the SNMP manager 709 decomposes the MIB information request packet (step 815), produces an MIB information command signal and sends the MIB information command signal to the MIB generator 712 (step 820). The MIB information generator 712 generates and returns the data needed to construct an MIB file to the agent 709 (step 825). The agent 709 receives the data from the MIB information generator, forms the MIB PDUs corresponding to the data and sends the data to the SNMP manager 701 via the protocol interface 707 and the LAN 120 (step 830).

Figure 9:
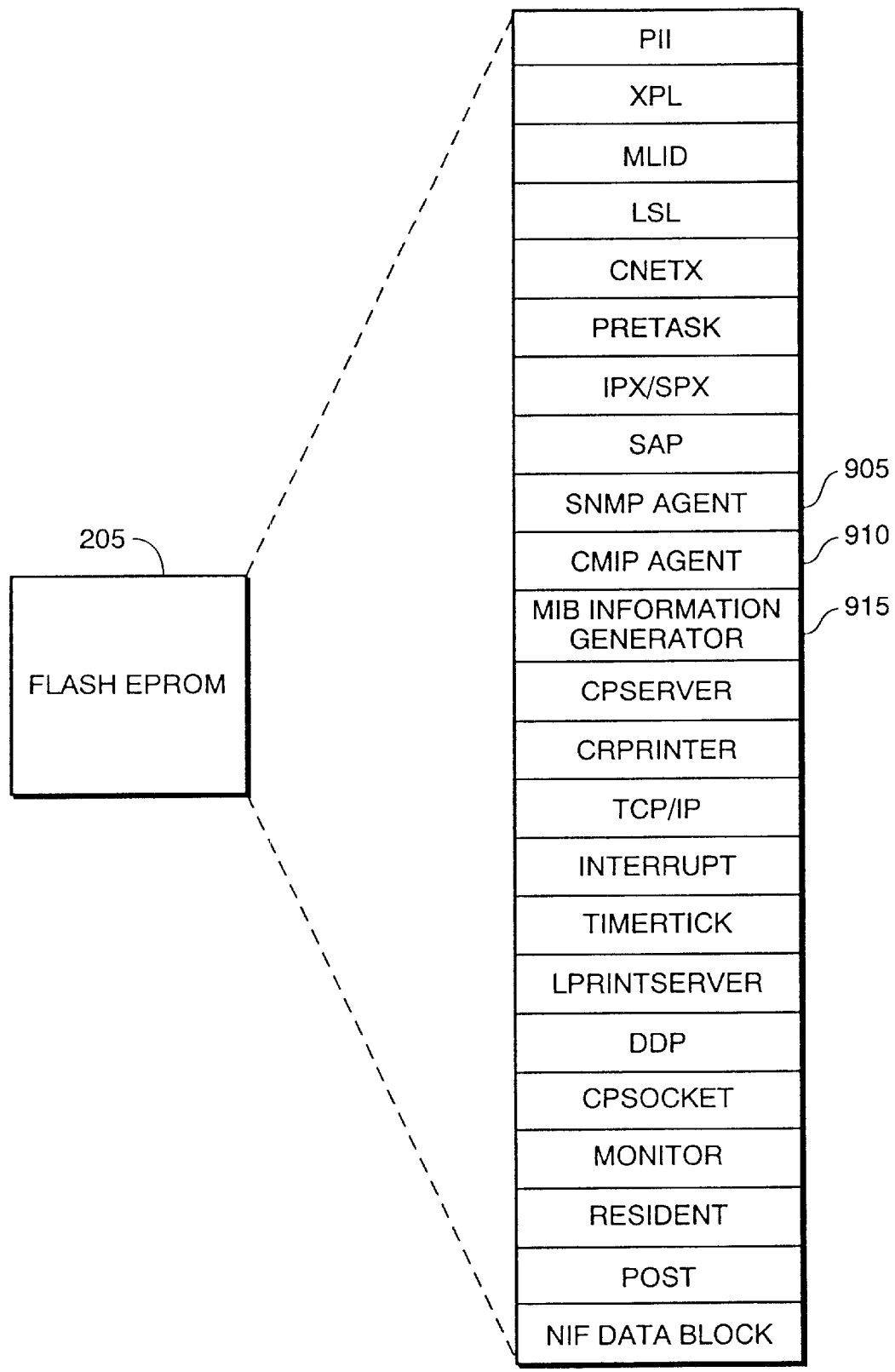
FIG. 9 shows an arrangement of agent and management information base software modules in the control memory of the network interface board of FIG. 2 according to the second embodiment.

As aforementioned with respect to FIG. 5, the agents and the MIB information generators are instruction code modules in the flash memory 205 which control the operations of the microprocessor 201 of the NEB 115 shown in FIG. 2. FIG. 9 shows the placement of the agent instruction code modules 905 and 910 and the MIB information generator module 915 in the flash memory 205. When the agent module is activated responsive to the MIB information request of the SNMP processing module manager 701, the microprocessor 201 performs the operations of steps 810, 815 and 820. The MIB information generator module 915 is then activated so that the managed device characteristics data is transferred to the SNMP agent module (step 825). The SNMP agent module is then activated so that the microprocessor 201 forms the PDUs corresponding to the MIB information data and sends the MIB data PDUs to the SNMP manager (step 830). As discussed with respect to FIG. 5, the agent either sends command signals to the MIB information generator module 915 which forms and sends return signals to the agent 905 or the agent addresses the attribute signals stored in the MIB information generator 915 and retrieves attribute value signals therefrom.

While preferred embodiments of the invention have been described, it is to be understood that the invention is not limited to the above described embodiments and that various changes and modifications may be made by those of ordinary skill in the art without departing from the spirit and scope of the invention.

What is claimed is:

1. An apparatus for interfacing between a network and a printing device, wherein the apparatus includes plural senders for, in response to a request from an external device, providing the network with data using one of plural management protocols, comprising:

first sender for providing the network with the data using a first management protocol;

second sender for providing the network with the data using a second management protocol;

receiver for receiving print data to be transmitted to the managed printing device and a request having one of the plural management protocols via a network communication protocol and for forwarding the print data to the managed printing device and the request from the network to either the first sender or the second sender, the request requesting information descriptive of the managed printing device; and generator for generating the information descriptive of the managed printing device based on status data from the managed printing device;

wherein the first sender, in response to the request having the first management protocol, obtains the information from the generator and formats the data including the obtained information according to the first management protocol, and the second sender, in response to the request having the second management protocol, obtains the information from the generator and formats the data including the obtained information according to the second management protocol.

2. An apparatus according to claim 1, wherein the generator generates MIB information and one of the first sender and the second sender is an SNMP sender.

3. An apparatus according to claim 1, wherein the status data includes information on on-line, printing, off-line, not printing, in sleep mode, paper out, printer open, paper jam, or toner low.

4. An apparatus according to claim 1, wherein the generator generates the information corresponding to characteristics of the managed printing device based on attribute information for the managed printing device which is stored in the apparatus.

5. An apparatus according to claim 1, wherein the sender converts the obtained information to a response request having the management protocol and representing characteristics of the managed printing device.

6. A peripheral apparatus including plural senders for, in response to a request from an external device, providing the network with data using one of plural management protocols, comprising:

first sender for providing the network with the data using a first management protocol;

second sender for providing the network with the data using a second management protocol;

receiver for receiving print data to be transmitted to a managed printing device and a request having one of the plural management protocols via a network communication protocol and for forwarding the print data to the managed printing device and the request from the network to either the first sender or the second sender, the request requesting information descriptive of the managed printing device; and generator for generating the information descriptive of the managed printing device based on status data from the managed printing device;

wherein the first sender, in response to the request having the first management protocol, obtains the information from the generator and formats the data including the obtained information according to the first management protocol, and the second sender, in response to the request having the second management protocol, obtains the information from the generator and formats the data including the obtained information according to the second management protocol.

7. An apparatus according to claim 6, wherein the generator generates MIB information and one of the first sender and the second sender is an SNMP sender.

8. An apparatus according to claim 6, wherein the status data includes information on on-line, printing, off-line, not printing, in sleep mode, paper out, printer open, paper jam, or toner low.

9. An apparatus according to claim 6, wherein the generator generates the information corresponding to characteristics of the managed printing device based on attribute information for the managed printing device which is stored in the apparatus.

10. An apparatus according to claim 6, wherein the sender converts the obtained information to a response request having the management protocol and representing characteristics of the managed printing device.

11. A method for supplying a network with information descriptive of a managed printing device, the method comprising the steps of:

receiving print data to be transmitted to the managed printing device and a request having one of the plural management protocols via a network communication protocol;

forwarding the print data to the managed printing device and forwarding the request from the network to either a first sender or a second sender, the request requesting information descriptive of the managed printing device; and generating the information descriptive of the managed printing device based on status data from the managed printing device;

wherein the first sender, in response to the request having the first management protocol, obtains the information generated in the generating step and formats the data including the obtained information according to the first management protocol, and the second sender, in response to the request having the second management protocol, obtains the information generated in the generating step and formats the data including the obtained information according to the second management protocol.

12. A method according to claim 11, wherein the first sender and the second sender decompose the request into a command and transmit a command to obtain the information.

13. A method according to claim 11, wherein the generating step generates MIB information and one of the first sender and the second sender is an SNMP sender.

14. A method according to claim 11, wherein a request having the first management protocol is forwarded to the first sender and a request having the second management protocol is forwarded to the second sender.

15. A method according to claim 11, wherein the request is a request packet.

16. A method according to claim 11, wherein the method is performed by a network board which is connected to the managed printing device.

17. A method according to claim 16, further comprising transferring the print data and control information from the network to the managed printing device.

18. A method according to claim 11, wherein the status data includes information on on-line, printing, off-line, not printing, in sleep mode, paper out, printer open, paper jam, or toner low.

19. A method according to claim 11, wherein the generating step generates the information corresponding to characteristics of the printing device based on attribute information for the printing device.

20. A method according to claim 11, wherein the sender converts the obtained information to a response request having the management protocol and representing characteristics of the printing device.

21. A program for supplying a network with information descriptive of a printing device, the program managing the printing device and performing the steps of:

receiving print data to be transmitted to the managed printing device and a request having one of the plural management protocols via a network communication protocol;

forwarding the print data to the managed printing device and the request from the network to either a first sender or a second sender, the request requesting information descriptive of the managed printing device; and generating the information descriptive of the managed printing device based on status data from the managed printing device;

wherein the first sender, in response to the request having the first management protocol, obtains the information generated in the generating step and formats the data including the obtained information according to the first management protocol, and the second sender, in response to the request having the second management protocol, obtains the information generated in the generating step and formats the data including the obtained information according to the second management protocol.

22. A storage medium storing a program for supplying a network with information descriptive of a managed printing device, the program performing the steps of:

receiving print data to be transmitted to the managed printing device and a request having one of the plural management protocols via a network communication protocol;

forwarding the print data to the managed printing device and a request from the network to either the first sender or the second sender, the request requesting information descriptive of the managed printing device; and generating the information descriptive of the managed printing device based on status data from the managed printing device;

wherein the first sender, in response to the request having the first management protocol, obtains the information generated in the generating step and formats the data including the obtained information according to the first management protocol, and the second sender, in response to the request having the second management protocol, obtains the information generated in the generating step and formats the data including the obtained information according to the second management protocol.

23. An apparatus for interfacing between a network and a printing device, wherein the apparatus includes plural senders for, in response to a request from an external device, providing the network with data using one of plural management protocols, comprising:

first sender for providing the network with the data using a first management protocol;

second sender for providing the network with the data using a second management protocol; and receiver for receiving print data to be transmitted to the managed printing device and a request having one of the plural management protocols via a network communication protocol and for forwarding the print data to the managed printing device and the request from the network to either the first sender or the second sender, the request requesting information about the managed printing device;

wherein the first sender, in response to the request having the first management protocol, obtains the information and formats the data including the obtained information according to the first management protocol, and the second sender, in response to the request having the second management protocol, obtains the information and formats the data including the obtained information according to the second management protocol.

24. An apparatus according to claim 23, wherein the information about the managed device indicates attribute of the managed printing device or status of the managed printing device.

25. A peripheral apparatus including plural senders for, in response to a request from an external device, providing the network with data using one of plural management protocols, comprising:

first sender for providing the network with the data using a first management protocol;

second sender for providing the network with the data using a second management protocol;

a controller for controlling a printing process; and receiver for receiving print data to be transmitted to the peripheral apparatus and a request having one of the plural management protocols via a network communication protocol and for forwarding the print data to the controller and the request from the network to either the first sender or the second sender, the request requesting information about the peripheral apparatus;

wherein the first sender, in response to the request having the first management protocol, obtains the information and formats the data including the obtained information according to the first management protocol, and the second sender, in response to the request having the second management protocol, obtains the information and formats the data including the obtained information according to the second management protocol.

26. An apparatus according to claim 25, wherein the information about the peripheral apparatus indicates attribute of the peripheral apparatus or status of the peripheral apparatus.

27. A method for supplying a network with information about a managed printing device, the method comprising the steps of:

receiving print data to be transmitted to the managed printing device and a request having one of the plural management protocols via a network communication protocol; and forwarding the print data to the managed printing device and the request from the network to either a first sender or a second sender, the request requesting information about the managed printing device;

wherein the first sender, in response to the request having the first management protocol, obtains the information and formats the data including the obtained information according to the first management protocol, and the second sender, in response to the request having the second management protocol, obtains the information and formats the data including the obtained information according to the second management protocol.

28. A method according to claim 27, wherein the information about the managed device indicates attribute of the managed printing device or status of the managed printing device.

29. A method according to claim 27, further comprising the step of providing the network with the formatted data from the first sender or the second sender.

30. A program for supplying a network with information about a managed printing device, the program managing the printing device and performing the steps of:

receiving print data to be transmitted to the managed printing device and a request having one of the plural management protocols via a network communication protocol; and forwarding the print data to the managed printing device and the request from the network to either a first sender or a second sender, the request requesting information about the managed printing device;

wherein the first sender, in response to the request having the first management protocol, obtains the information and formats the data including the obtained information according to the first management protocol, and the second sender, in response to the request having the second management protocol, obtains the information and formats the data including the obtained information according to the second management protocol.

31. A program according to claim 30, wherein the information about the managed device indicates attribute of the managed printing device or status of the managed printing device.

32. A program according to claim 30, wherein the program performs the step of providing the network with the formatted data from the first sender or the second sender.

* * * * *

UNITED STATES PATENT AND TRADEMARK OFFICE
CERTIFICATE OF CORRECTION

PATENT NO. : 6,581,101 B2
DATED : June 17, 2003
INVENTOR(S) : Victor Villalpando It is certified that error appears in the above-identified patent and that said Letters Patent is hereby corrected as shown below:

<u>Column 4,</u>
Lines 11 and 19, "according" should read -- according to --.

<u>Column 7,</u>
Line 26, "uses 201" should read -- 201 uses --.

Signed and Sealed this

Thirtieth Day of December, 2003

JAMES E. ROGAN
*Director of the United States Patent and Trademark Office*